US012712609B1

(12) United States Patent
Wanner et al.

(10) Patent No.: US 12,712,609 B1
(45) Date of Patent: Aug. 18, 2026

(54) SYSTEM FOR FREQUENCY DOMAIN RECEIVE CHANNELIZATION

(71) Applicant: AMAZON TECHNOLOGIES, INC., Seattle, WA (US)

(72) Inventors: Shannon L. Wanner, Monroe, WA (US); Kyle Regan Myers, San Diego, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 42 days.

(21) Appl. No.: 18/973,973

(22) Filed: Dec. 9, 2024

(51) Int. Cl.
*H04B 7/0456* (2017.01)

(52) U.S. Cl.
CPC .................................. *H04B 7/0456* (2013.01)

(58) Field of Classification Search
CPC .......... H04B 7/02; H04B 7/04; H04B 7/0413; H04B 7/0456; H04B 7/0469; H04B 7/08; H04B 7/0837; H04B 7/0842; H04B 7/0865; H04B 7/0857; H04B 7/0868; H04B 7/0874; H04B 7/0882; H04B 7/0885; H04B 7/0888; H01Q 3/26; H01Q 3/2658; H01Q 3/2682; H01Q 3/2694; H01Q 3/2688
See application file for complete search history.

(56) References Cited

U.S. PATENT DOCUMENTS

| | | | | |
|---|---|---|---|---|
| 8,013,791 | B1 * | 9/2011 | Weber | H01Q 3/38 342/372 |
| 9,516,410 | B1 * | 12/2016 | Ayrapetian | H04R 3/02 |
| 9,589,575 | B1 * | 3/2017 | Ayrapetian | G10L 25/18 |
| 9,831,933 | B1 * | 11/2017 | Chieh | H03M 1/66 |
| 9,997,151 | B1 * | 6/2018 | Ayrapetian | G10K 11/178 |
| 10,340,921 | B2 * | 7/2019 | Wanner | G01P 15/18 |
| 10,348,381 | B2 * | 7/2019 | Jaldén | H04B 17/101 |
| 10,446,938 | B1 * | 10/2019 | Wang | H01Q 9/0407 |

(Continued)

OTHER PUBLICATIONS

"Application of Kuiper Systems LLC for Authority to Launch and Operate a Non-Geostationary Satellite Orbit System in Ka-band Frequencies", Technical Appendix, 74 pgs. Retrieved from the Internet: URL: https://fcc.report/IBFS/SAT-LOA-20190704-00057/1773885.

(Continued)

*Primary Examiner* — James M Perez
(74) *Attorney, Agent, or Firm* — Lindauer Law, PLLC

(57) ABSTRACT

A phased array antenna (PAA) comprising thousands of antennas acquires radio frequency analog signals that are processed by analog to digital converters to generate time domain raw samples. A digital beamformer (DBF) connected to a subset of these antennas processes the raw samples into frequency domain (FD) samples that are processed by a beamformer algorithm. In one implementation the beamformed FD samples are sent to a processor that filters samples into arbitrary frequency ranges associated with arbitrary channels. The filtered samples are then converted back to time domain (TD) channel samples that are then processed by a demodulator to recover data. In another implementation the DBF performs the filtering and conversion to TD, with the TD channel samples sent to a demodulator to recover data. This system supports reception and processing of analog waveforms of various bandwidths within an overall receive passband acquired by a PAA.

20 Claims, 8 Drawing Sheets

(56) References Cited

U.S. PATENT DOCUMENTS

| | | | | |
|---|---|---|---|---|
| 10,491,443 | B1 * | 11/2019 | Khan | H04B 1/04 |
| 10,554,210 | B2 * | 2/2020 | Wanner | G01P 15/03 |
| 11,233,557 | B2 * | 1/2022 | Lee | H04B 7/088 |
| 12,040,557 | B1 * | 7/2024 | Sharma | H01Q 3/38 |
| 12,476,659 | B1 * | 11/2025 | Peiffer | H04B 1/0003 |
| 2010/0194629 | A1 * | 8/2010 | Craig | H01Q 3/26 342/372 |
| 2011/0188597 | A1 * | 8/2011 | Agee | H04W 28/06 375/267 |
| 2012/0230380 | A1 * | 9/2012 | Keusgen | H04B 7/0695 375/227 |
| 2013/0286960 | A1 * | 10/2013 | Li | H04B 7/0684 370/329 |
| 2013/0301454 | A1 * | 11/2013 | Seol | H04B 7/0456 370/252 |
| 2014/0146863 | A1 * | 5/2014 | Seol | H04B 7/0617 375/224 |
| 2014/0169501 | A1 * | 6/2014 | Nazarathy | H03H 21/0012 375/316 |
| 2015/0061928 | A1 * | 3/2015 | Cornic | G01S 7/35 342/25 R |
| 2015/0236764 | A1 * | 8/2015 | Fujil | H04B 7/0413 375/267 |
| 2015/0326300 | A1 * | 11/2015 | Fujii | H04L 5/003 375/346 |
| 2016/0156391 | A1 * | 6/2016 | Fujii | H04L 25/021 455/63.4 |
| 2017/0019157 | A1 * | 1/2017 | Mo | H04B 7/0456 |
| 2018/0054832 | A1 * | 2/2018 | Luo | H04B 7/0626 |
| 2018/0109263 | A1 * | 4/2018 | Wanner | H03B 5/32 |
| 2018/0212658 | A1 * | 7/2018 | Miao | H04B 7/0456 |
| 2018/0343044 | A1 * | 11/2018 | Athley | H04B 7/0634 |
| 2019/0020123 | A1 * | 1/2019 | Petersson | H01Q 25/001 |
| 2019/0068234 | A1 * | 2/2019 | Khlat | H04B 1/40 |
| 2019/0097843 | A1 * | 3/2019 | Obara | H04B 7/0413 |
| 2019/0326914 | A1 * | 10/2019 | Wanner | G01P 15/00 |
| 2020/0028556 | A1 * | 1/2020 | Inoue | H04B 7/0617 |
| 2022/0224380 | A1 * | 7/2022 | Lee | G01S 13/426 |
| 2022/0247471 | A1 * | 8/2022 | van Houtum | H04B 7/0842 |
| 2023/0045598 | A1 * | 2/2023 | Maeda | G01R 29/08 |
| 2023/0046984 | A1 * | 2/2023 | Kim | H04B 7/0695 |
| 2024/0007151 | A1 * | 1/2024 | Kim | H04B 7/043 |
| 2024/0333367 | A1 * | 10/2024 | AlAmmouri | H04B 7/0456 |
| 2026/0025191 | A1 * | 1/2026 | Sohrabi | H04B 7/0617 |

OTHER PUBLICATIONS

"Optimal Beamforming", University of Toronto, 21 pages. Retrieved from the Internet: URL: https://www.comm.utoronto.ca/~rsadve/Notes/BeamForming.pdf.

"Polyphase Channelizer", GNU Radio, Wiki, 2 pages. Retrieved from the Internet: URL: https://wiki.gnuradio.org/index.php/Polyphase_Channelizer.

"A Beginner's Guide to Digital Signal Processing (DSP)", Analog Devices, 3 pgs. Retrieved from the Internet: URL: https://www.analog.com/en/lp/001/beginners-guide-to-dsp.html.

"Delay-and-Sum Beamforming", gfai tech, 2 pgs. Retrieved from the Internet: URL:https://www.gfaitech.com/knowledge/faq/delay-and-sum-beamforming-in-the-frequency-domain.

"Phase Shifter", Geeks for Geeks, Apr. 19, 2024, 18 pgs. Retrieved from the Internet: URL: https://www.geeksforgeeks.org/phase-shifter/.

Elbir, et al., "Twenty-Five Years of Advances in Beamforming: From Convex and Nonconvex Optimization to Learning Techniques", IEEE Signal Processing Magazine Special Issue on the 75th Anniversary of IEEE Signal Processing Society, Mar. 22, 2023, 13 pgs. Retrieved from the Internet: URL: https://arxiv.org/pdf/2211.02165.

Hahn, James, "Introduction to Digital Signal Processing", Jan. 27, 2011, 90 pgs. Retrieved from the Internet: URL: https://classes.engineering.wustl.edu/ese497/images/0/05/DSP_ESE497.

Hamdy, Mohamed Nadder, "Beamformers explained", Commscope, 28 pgs. Retrieved from the Internet: URL: https://www.commscope.com/globalassets/digizuite/542044-Beamformer-Explained-WP-114491-EN.pdf.

Haynes, Toby, "A Primer on Digital Beamforming", Spectrum Signal Processing, Mar. 26, 1998, 15 pgs. Retrieved from the Internet: URL: http://archive.eclass.uth.gr/eclass/modules/document/file.php/MHX214/Additional%20Material/%21%20A%20Primer%20on%20Digital%20Beamforming.pdf.

Kaufman, David, "Application of Kuiper Systems LLC for Authority to Launch and Operate a Non-Geostationary Satellite Orbit System in V-band and Ku-band Frequencies", Technical Appendix, Nov. 4, 2021, 36 pgs. Retrieved from the Internet: URL: https://fcc.report/IBFS/SAT-LOA-20211104-00145/13337528.pdf.

Kwon, et al., "Satellite Digital Channelizer Beamforming With Predistorted High-Power Amplifier", Wichita State University, Department of Electrical Engineering and Computer Science, Nov. 10, 2019, 62 pgs. Retrieved from the Internet: URL: https://apps.dtic.mil/sti/pdfs/AD1090326.pdf.

Langlois, Luc, "Beamforming: Fundementals to Implementation", AVNET, 2021, 24 pgs. Retrieved from the Internet: URL: https://www.avnet.com/wps/wcm/connect/onesite/74e47590-0644-471a-987c-51520c347279/SPMT-RFSoC-white-paper-6.pdf?MOD=AJPERES&CVID=nQaWL9R&CVID=nQaWL9R&CVID=nQ1g63w&CVID=nQ1g63w&CVID=nQ1g63w&CVID=nQ1g63w&CVID=nQ1g63w&CVID=nQ1g63w&CVID=nQ1g63w&CVID=nQ1g63w&attachment=false&id=163640357104.

Navarro, Alvaro Palomo, "Channelization for Multi-Standard Software-Defined Radio Base Stations", Department of Electronic Engineering, National University of Ireland Maynooth, Oct. 2011, 277 pgs. Retrieved from the Internet: URL: https://mural.maynoothuniversity.ie/3722/1/Channlization_for_Multistandard_SDR_Base_Stations-Alvaro_Palomo_PhD.pdf.

Pucker, Lee, "Channelization Techniques for Software Defined Radio", Proceeding of the SDR 03 Technical Conference and Product Exposition, 2003, 6 pgs. Retrieved from the Internet: URL: https://www.wirelessinnovation.org/assets/Proceedings/2003/2003-hw2-002-pucker.pdf.

Robertson, Neil, "Phase or Frequency Shifter Using a Hilbert Transformer", DSP Related, Mar. 25, 2018, 18 pgs. Retrieved from the Internet: URL: https://www.dsprelated.com/showarticle/1147.php.

Stoica, et al., "Robust Capon Beamforming", IEEE Signal Processing, vol. 10, No. 6, , Jun. 6, 2003, 4 pgs. Retrieved from the Internet: URL: http://www.sal.ufl.edu/eel6537/2006/rcb2.pdf.

Tan, et al., "Polyphase Filter", Science Direct, Engineering, 2019, 9 pgs. Retrieved from the Internet: URL: https://www.sciencedirect.com/topics/engineering/polyphase-filter.

* cited by examiner

300

RAW SAMPLES 178

FREQUENCY 302

CHANNEL(S) 330

0 1 2 3 9 10 11 12 13 ...

4 5 6 7 8

ARBITRARY CHANNEL BANDWIDTH 360(1)

ARBITRARY CHANNEL BANDWIDTH 360(8)

ARBITRARY CHANNEL BANDWIDTH 360(11)

SYSTEM FOR FREQUENCY DOMAIN RECEIVE CHANNELIZATION

BACKGROUND

An analog signal or set of analog signals may be represented as a set of samples. The set of analog signals may contain analog signals associated with different frequency ranges or channels. Channelization provides samples that are associated with a specified channel.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
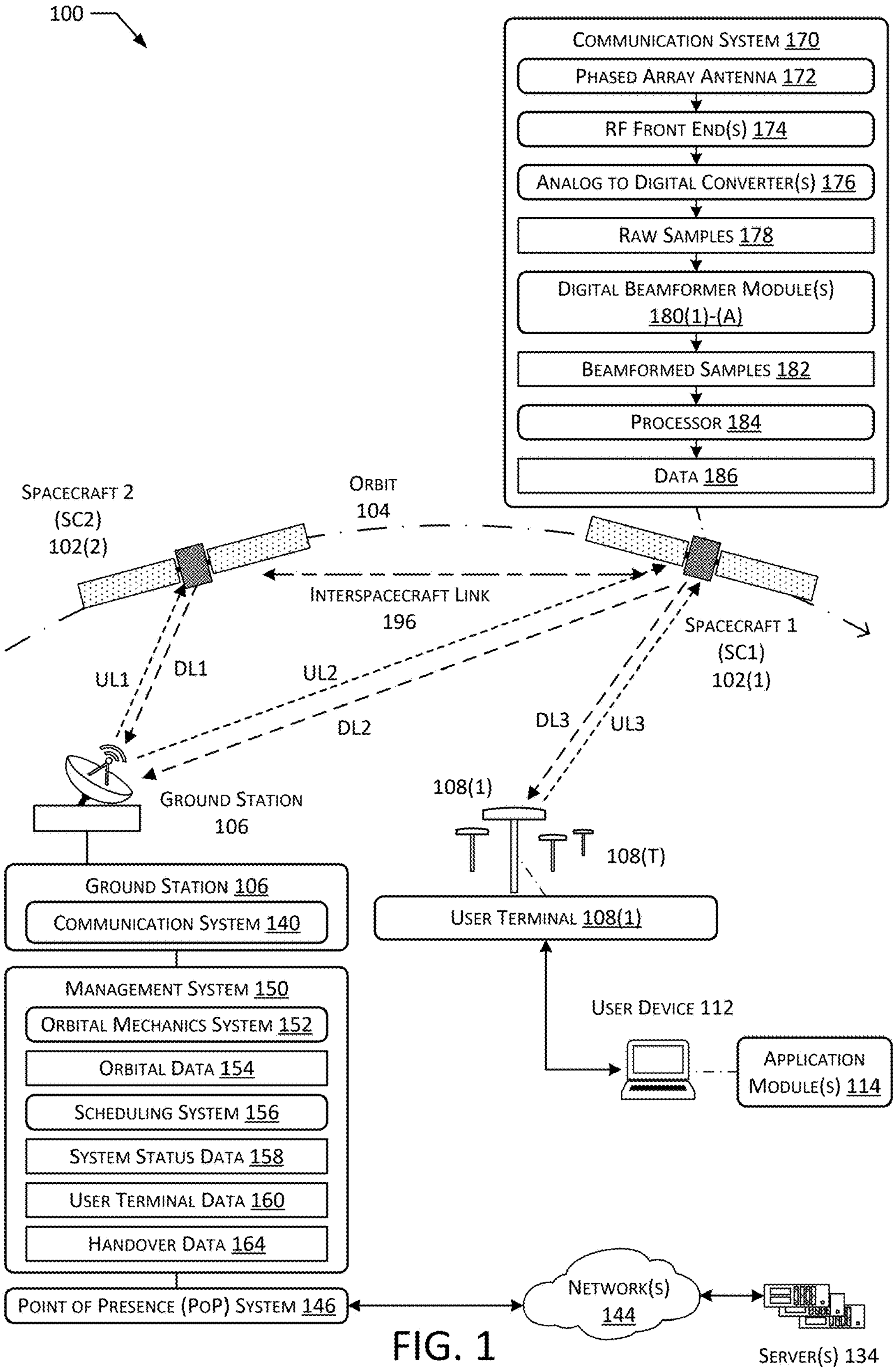
FIG. 1 illustrates a spacecraft communication system comprising a frequency domain channelization system allowing arbitrary channelization, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize spacecraft to wirelessly transfer data between user terminals and ground stations that in turn connect to other networks, such as the Internet. The spacecraft provide communication services between ground stations and devices, such as user terminals (UT) located on or near a body such as the Earth. For example, a first UT at a first geographic location (geolocation) on the Earth may send upstream data to a first spacecraft that is in range of the first UT. The first spacecraft may send the upstream data to a gateway, another spacecraft, and so forth. For example, the first spacecraft may send the upstream data to a gateway that in turn sends the upstream data to a point-of-presence (POP). The POP may then send the upstream data to a device on another network, such as a server on the Internet.

Likewise, downstream data destined for the first UT may be received at the POP. The POP sends the downstream data to the gateway that in turn uses a ground station uplink to send the downstream data to the first spacecraft. The first spacecraft then sends the downstream data to the first UT.

For ease of illustration, and not necessarily as a limitation, a spacecraft may be deemed "in range" of a station such as a gateway or UT when communication may take place with that station. For example, a spacecraft may be in range when it is within line of sight of the gateway, a distance between the spacecraft and the gateway is less than a threshold distance, the gateway is within a footprint of an antenna onboard the spacecraft, and so forth. One of the factors that determines how long a spacecraft is within range of the station is an orbital period of the spacecraft, that is determined by the altitude of the spacecraft.

The period, or duration, of an orbit varies depending upon the altitude of the spacecraft with respect to the body, eccentricity of the orbit, and so forth. For example, a spacecraft at an altitude of 600 kilometers (km) will take approximately 96 minutes to complete a circular orbit around the Earth. Depending on a variety of factors including the curvature of the Earth, a spacecraft may be in range of a particular station for only a few minutes. This results in a station being frequently handed off from one spacecraft to another to maintain continuous communication services. In comparison, a geosynchronous spacecraft has an orbital period that coincides with the rotation of the Earth, so a geosynchronous spacecraft appears to remain motionless with respect to the Earth. While the apparent motionlessness with respect to the station removes the need for handoffs, other drawbacks associated with the geosynchronous spacecraft remain.

Signals between the station and the spacecraft are limited to travelling at the speed of light. The farther away a spacecraft is from the station, the longer it takes for a signal to travel to the spacecraft and then travel back to Earth. For example, a hop (sending a signal to the spacecraft and back down to the ground, or vice versa) to a geosynchronous spacecraft introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) spacecraft at an altitude of 600 km only introduces about 4 ms of latency comprising 2 ms up to the spacecraft and 2 ms down to the station. However, the latency does vary as distance to the NGO spacecraft changes. As a result, compared to using geosynchronous spacecraft, the use of NGO spacecraft significantly reduces latencies due to signal travel times.

Due to the constant relative motion of the spacecraft relative to the stations on or near the Earth, the signals between the spacecraft and the station experience changes in frequency due to the Doppler effect. For example, as the spacecraft moves towards the station, the frequency of a signal received at the spacecraft appears (to the receiver onboard the spacecraft) to have been shifted to a higher frequency. Similarly, as the spacecraft moves away from the station, the frequency of a signal received at the spacecraft appears (to the receiver onboard the spacecraft) to have been shifted to a lower frequency. To maintain communication, these Doppler effects may be taken into consideration and received signals may be adjusted accordingly.

Using a constellation of many NGO spacecraft offers significant benefits compared to a geosynchronous spacecraft. Latency is dramatically reduced, improving usefulness for communication. Shorter distances between the station and the spacecraft allow for increased station density by allowing greater frequency re-use and sharing. Power and antenna gain requirements for both the station and the spacecraft are also reduced due to the shorter distances, compared to communication using geosynchronous spacecraft. This allows for relatively smaller and less expensive spacecraft to be used.

The NGO spacecraft may utilize phased array antennas (PAA) to receive, transmit, or receive and transmit signals. The signals used by the constellation have several characteristics. An analog signal may have a carrier frequency, such as 23 gigahertz (GHz). An analog signal has a bandwidth, indicating a range of frequences that the analog signal may be confined to. For example, an analog signal may have a bandwidth of 5 megahertz (MHz). For various reasons, such as licensing requirements or to improve performance, a portion of radio frequency spectrum that is used by the constellation may be divided into channels. Each channel designates a specified frequency range. During operation, analog signals may be generated and received that have bandwidths that are within a particular channel. Traditionally these channels may be fixed, such that each channel accommodates analog signals with the same bandwidth. For example, the constellation may be licensed by a regulatory authority to send signals from a UT to a spacecraft within 400 MHz of radio spectrum in a 28 GHz band. Traditionally, during operation this would be divided into equal portions of spectrum, such as 16 channels of 25 MHz bandwidth each.

The PAA comprises many smaller antennas. Analog radio frequency signals acquired from each of these smaller antennas are provided to radio receivers with the resulting analog signals converted by analog-to-digital converters (ADCs) to digital "raw" samples. These raw samples may represent measured amplitudes of analog signals at various frequencies over time, producing samples in the time domain. For example, each sample represents an amplitude of a sample of a signal during a specific time interval. If the samples are acquired at a sufficiently fast sample rate, such as twice the bandwidth of the analog signal, the samples may provide a highly accurate representation of the analog signals.

Once acquired, the raw samples may be processed in different ways. For example, beamforming algorithms may apply changes to the values of the samples to introduce phase, amplitude, or other changes to samples to produce beamforming effects at specified frequencies. A beamforming effect allows the PAA to be electronically "steered", producing gain in various directions with respect to the PAA without physically moving the PAA. For example, the beamforming effect may be used to produce a "beam". Signals received from within the beam will exhibit a greater amplitude than signals outside of the beam. Beamforming may be used to preferentially receive signals from particular locations. By processing the raw samples, one or more beams may be manifested, up to the limit of the hardware to perform the necessary calculations. This provides great flexibility during operation.

During operation of a system such as the constellation, it becomes apparent that the scale of data being processed rapidly becomes enormous while processing the raw samples from a single PAA comprising many elements. For example, the PAA may comprise thousands of antennas and RF receivers with associated ADCs. Each ADC sampling a signal with a 400 MHz bandwidth would produce 800 million samples per second (megasamples per second or Msps). To avoid latency issues or loss of information, these raw samples must be timely processed. As mentioned above, such processing may include application of beamforming algorithms to produce desired beam characteristics. This is a substantial computing task, requiring memory and processing units, electrical power to perform these operations, and producing substantial heat during operation that needs to be dissipated. The addition of other processing operations further increases the computing requirements.

Traditionally the processing of many samples per second has involved numerous design tradeoffs, including using a "pipeline" or sequence of hardware and software to sequentially process data in an effort to minimize the overall quantity of samples being processed and the complexity of those operations being performed. However, such techniques introduce substantial constraints on the flexibility of the system. Such constraints become particularly challenging in situations in which it is infeasible to make future changes to hardware. For example, in a terrestrial communication system it may be reasonable to expect that in a few years a technician may visit a site and upgrade communication hardware. However, this is infeasible for a constellation of spacecraft in orbit.

As a result, traditional systems are limited in their initial performance and subsequent capability to be updated to accommodate analog signals that may use some arbitrary channel bandwidth. For example, a traditional communication system may be designed to operate with a first analog waveform having a bandwidth of 50 MHz but may be unable to operate using a second analog waveform having a bandwidth such as 5 MHz. In another example, a traditional communication system may be unable to support arbitrary channels with bandwidths that are rational number multiples of one another.

Described in this disclosure are systems and techniques to process analog signals having channels of arbitrary bandwidth that are received by a communication system comprising a PAA. The system is able to provide output data that is suitable for demodulation to recover data that is transmitted by those analog signals. The system allows for extremely flexible reconfiguration, and may accommodate channels of arbitrary bandwidth within a receive bandwidth of the system. The system may be deployed on a satellite of an NGO constellation, allowing signals to be simultaneously received and processed from stations such as UTs that are sending uplink signals using different channels. Individual ones of the different channels may be used with different analog waveforms such as sets of subcarriers and modulation techniques, allowing substantial flexibility.

The system comprises a phased array antenna (PAA) comprising thousands of antennas acquiring radio frequency (RF) analog signals that are processed by analog to digital converters (ADCs) to generate time domain (TD) raw samples.

A digital beamformer (DBF) connected to a subset of these antennas processes the raw samples into frequency domain (FD) samples. For example, a Discrete Fourier Transform (DFT) algorithm may be used to process the raw samples to generate TD raw samples. The TD raw samples may then be processed at the DBF by a first beamformer algorithm. For example, a delay and sum beamforming technique may be used to process the TD raw samples and generate first beamformed FD data.

The DBF sends the first beamformed FD samples to another device, such as a processor. The processor may comprise one or more digital signal processors (DSP), general processors, field-programmable gate arrays (FPGAs), and so forth. The processor filters the first beamformed FD samples using one or more filter algorithms to generate filtered samples. The filtered samples correspond to those samples, in the FD, that correspond to a specified channel or range of frequencies. The filtered samples are then processed by an inverse DFT algorithm to generate TD channel samples. In some implementations, additional beamforming operations may be performed by the processor. The TD channel samples may then be processed by a demodulator to determine data that was encoded by the analog signal(s) associated with the respective channels.

With regard to the first implementation, the distribution of the processing of the first beamformed FD samples from the DBF to the processor allows the use of arbitrary channelization to the limit of the memory and computational capabilities of the processor. This distribution may also result in one or more of reduced power consumption or less processing time compared to performing those operations on the DBF. For example, the processor may only execute a single instance of an inverse Discrete Fornier Transform (IDFT) algorithm for the filtered samples associated with each channel.

In a second implementation the first beamformed FD data may be filtered at the DBF using one or more filter algorithms to generate filtered samples. The filtered samples correspond to those samples, in the FD, that correspond to a specified channel or range of frequencies. The filtered samples are then processed by an inverse DFT algorithm to generate beamformed TD channel samples. The beamformed TD channel samples may then be sent to a processor. The processor may then process the beamformed TD channel samples received from a plurality of DBFs to generate TD channel samples. In some implementations, additional beamforming operations may be performed by the processor. The TD channel samples may then be processed by a demodulator to determine data that was encoded by the analog signal(s) associated with the respective channels.

With regard to the second implementation, performing the filter and IDFT operations at the DBF results in less data being sent to the processor, compared to the first implementation. As a result, this allows more efficient use of the connection between the DBFs and the processor(s).

By using these techniques and systems, a communication system may be deployed that is able to simultaneously support multiple waveforms with different bandwidths and facilitate future changes to those waveforms. This improves overall flexibility of the system to operate in different regulatory and technical modes over extended periods of time.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

As height above ground increases, the area on the ground that is visible from that elevated point increases. For example, the higher you go in a building or on a mountain, the farther you can see. The same is true for the electromagnetic signals used to provide communication services. A communication relay having a radio receiver and transmitter with its antennas placed high above the ground is able to "see" more ground and provide communication service to a larger area. A communication relay placed on a spacecraft high in space is able to provide communication services to many users across a large geographic area.

A spacecraft may be maintained in space for months or years by placing it into orbit around the Earth. Once placed, further physical maintenance such as performing an equipment changeout on the spacecraft may be infeasible. The movement of the spacecraft in orbit is directly related to the height above ground. For example, the greater the altitude the longer the period of time it takes for a spacecraft to complete a single orbit. A spacecraft in a geosynchronous orbit at an altitude of 35,800 km may appear to be fixed with respect to the ground because the period of the geosynchronous orbit matches the rotation of the Earth. In comparison, a spacecraft in a non-geosynchronous orbit (NGO) will appear to constantly move with respect to the Earth. For example, a spacecraft in a circular orbit at 600 km will circle the Earth about every 96 minutes.

Spacecraft in NGOs may be used to alleviate various drawbacks associated with spacecraft in geosynchronous orbit. The altitude of an NGO is high enough to provide coverage to a large portion of the ground, while remaining low enough to minimize latency due to signal propagation time. For example, the lower altitude of the spacecraft in NGO, compared to a geosynchronous orbit, provides coverage over a much smaller portion of the Earth. The lower altitude also reduces the distance the electromagnetic signal has to travel. For example, the spacecraft at 600 km only introduces 4 ms of latency for a single hop. Compared to the geosynchronous orbit, the reduced distance of the NGO reduces the dispersion of electromagnetic signals. This allows the spacecraft in NGO as well as the device communicating with the spacecraft to use a less powerful transmitter, use smaller antennas, and so forth. For example, the device communicating with the spacecraft may be a cellular telephone handset.

The system 100 shown here comprises a plurality (or "constellation") of spacecraft 102(1), 102(2), . . . , 102(S), each spacecraft 102 being in orbit 104. Also shown is a ground station 106, user terminals (UTs) 108, and user devices 112. Each user device 112 may execute one or more application modules 114. For example, the application modules 114 may comprise email applications, telephony applications, videoconferencing applications, telemetry applications, web browser applications, and so forth.

The constellation may comprise hundreds or thousands of spacecraft 102, in various orbits 104. For example, one or more of these spacecraft 102 may be in non-geosynchronous orbits (NGOs) in which they are in constant motion with respect to the Earth, such as a low earth orbit (LEO). In this illustration, orbit 104 is depicted with an arc pointed to the right. A first spacecraft (SC1) 102(1) is leading (ahead of) a second spacecraft (SC2) 102(2) in the orbit 104. The spacecraft 102 is discussed in more detail with regard to FIG. 2.

With regard to FIG. 1, an uplink is a communication link which allows data to be sent from a ground station 106 to a spacecraft 102, from a UT 108 to the spacecraft 102, or from another device to the spacecraft 102. Uplinks are designated as UL1, UL2, UL3 and so forth. For example, UL1 is a first uplink from the ground station 106 to the second spacecraft 102(2). In comparison, a downlink is a communication link which allows data to be sent from the spacecraft 102 to a ground station 106, UT 108, or device other than another spacecraft 102. For example, DL1 is a first downlink from the second spacecraft 102(2) to the ground station 106. The spacecraft 102 may also be in communication with one another. For example, an interspacecraft link (ISL) 196 provides for communication between spacecraft 102 in the constellation.

One or more ground stations 106 are in communication with one or more spacecraft 102. The ground stations 106 may pass data between the spacecraft 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more spacecraft 102, other ground stations 106, and so forth. The ground station 106 may also be connected to one or more communication networks 144. For example, the ground station 106 may connect to a terrestrial fiber optic communication network 144.

The ground station 106 may act as a network gateway, passing data between the one or more communication networks 144 and the spacecraft 102. Such data may be processed by the ground station 106 and communicated via the communication system 140. The communication system 140 of a ground station 106 may include components similar to those of a communication system 170 of a spacecraft 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

In some implementations, the ground station uplink to the spacecraft 102 may utilize various techniques such as transmitting different signals using the same frequency and different polarizations, transmitting several signals on different frequencies, and so forth. These techniques may be used to increase the amount of data that may be transmitted from the ground station 106 to the spacecraft 102 per unit of time.

Onboard the spacecraft 102, corresponding hardware allows for the reception and demodulation of the data sent from another station such as a ground station 106 or a UT 108 on an uplink. The spacecraft 102 includes a communication system 170. The communication system 170 includes one or more antennas. For example, each spacecraft 102 may have two gateway antennas, each comprising a parabolic antenna. These gateway antennas may be connected to one or more radio-frequency (RF) front ends and provide communication with the ground stations 106. The spacecraft 102 may have one or more phased array antennas (PAAs) 172. In some implementations the PAAs 172 may be used to provide communication with the UTs 108. These PAAs 172 may be connected to one or more RF front ends 174. The RF front ends 174 may comprise software defined radios (SDRs), direct sampling receivers, and so forth. The RF front ends 174 may include, or may send data to, one or more analog-to-digital converters (ADCs) 176. The ADCs 176 provide as output raw samples 178. The raw samples 178 may represent measured amplitudes of analog signals at various frequencies over time. The ADCs 176 may utilize a sampling rate that is twice the bandwidth of the analog signal. For example, if the bandwidth of the analog signal is 400 MHz, the sampling rate may be 800 megasamples per second (Msps). In other implementations, other sampling rates may be used.

The raw samples 178 are processed by one or more digital beamformer (DBF) modules 180(1)-(A). The DBF module 180 applies one or more beamforming algorithms to the raw samples 178 and may perform other operations to generate beamformed samples 182. The beamformed samples 182 may then be sent to a processor 184. The processor 184 may comprise one or more devices. For example, the processor 184 may comprise one or more DSPs, general processors, FPGAs, and so forth. The processor 184 may perform operations on the beamformed samples 182 to generate samples that are then processed by a demodulator to recover data 186 that was represented by the analog signals acquired by the PAA 172. The data 186 may then be subsequently processed, such as routed and retransmitted to another UT 108 or ground station 106.

Operation of the DBF modules 180 and the processor 184 are discussed in more detail with regard to FIGS. 4A-6B.

The ground stations 106 are in communication with a management system 150. The management system 150 is also in communication, via the ground stations 106, with the spacecraft 102 and the UTs 108. The management system 150 coordinates operation of the spacecraft 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular spacecraft 102 at a specified time. In one implementation, the orbital mechanics system 152 may use orbital elements that represent characteristics of the orbit 104 of the spacecraft 102 in the constellation to determine the orbital data 154 that predicts location, velocity, and so forth of particular spacecraft 102 at particular times or time intervals. For example, the orbital mechanics system 152 may use data obtained from actual observations from tracking stations, data from the spacecraft 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first spacecraft 102(1) to the second spacecraft 102(2). Continuing the example, the scheduling system 156 may also specify communication parameters such as frequency, wide or narrow channels allocated, timeslot indicative of when transmission is permitted, and so forth. These communication parameters may be associated with operation of a ground station uplink to the spacecraft 102, downlink from the spacecraft 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, spacecraft availability, current spacecraft 102 in use by respective UTs 108, capacity available at particular ground stations 106, and so forth. For example, the spacecraft availability may comprise information indicative of spacecraft 102 that are available to provide communication service or those spacecraft 102 that are unavailable for communication service. Continuing the example, a spacecraft 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a spacecraft 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, waveforms to be used to communicate with the UT 108, and so forth. For example, a particular UT 108 may be a cellular handset that is associated with a specified waveform associated with a specified bandwidth that is compatible with the license and technical capabilities of that cellular handset. Over time, different versions of UTs 108 may be deployed or supported, having different communication capabilities such as being able to operate using different waveforms with different bandwidths and arbitrary channel allocations within a specified range of operating frequencies, supporting different signal encoding schemes, and so forth.

The handover data 164 is indicative of information such as a UT identifier indicative of a particular UT 108, a handover time indicative of when a handover is to occur, a next spacecraft identifier (ID) that is indicative of the next spacecraft 102 that will be providing communication service to the specified UT 108, channel allocations, and so forth. The handover data 164 facilitates an orderly transition of the UT 108 from a first spacecraft 102(1) to a second spacecraft 102(2).

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

The UT 108 includes a communication system, such as a spacecraft network interface, to establish communication with one or more spacecraft 102. The communication system of the UT 108 may include components similar to those of the communication system 170 of a spacecraft 102 and may perform similar communication functionalities. For example, the communication system may include one or more modems, digital signal processors, power amplifiers, antennas (including at least one antenna that implements multiple antenna elements, such as a phased array antenna), channel processing module(s), processors, memories, storage devices, communications peripherals, interface buses, and so forth.

The UT 108 passes data between the constellation of spacecraft 102 and the user device 112. The UT 108 may connect to the user device 112 using a second network interface. For example, the second network interface may comprise a wireless local area network, wired local area network, terrestrial wide area network, and so forth. The user device 112 may execute one or more application modules 114. The data includes upstream data sent by the user device 112 or downstream data that is addressed to the UT 108 or the user device 112. For example, during operation the application module 114 may send upstream data and receive downstream data. The upstream data and the downstream data each may comprise header data and payload data. The UT 108 may be fixed or in motion. For example, the UT 108 may be used at a residence, business, or on a vehicle such as a car, boat, aerostat, drone, or airplane, may be carried by a person, and so forth.

The system 100 may include one or more POP systems 146. Each PoP system 146 may comprise one or more servers or other computing devices. Separate POP systems 146 may be located at different locations. In one implementation, a POP system 146 may be associated with providing service to a plurality of UTs 108 that are located in a particular geographic region.

The POP systems 146 may manage communication between the system 100 and the network 144. For example, a first POP system 146 may receive the upstream data and send that upstream data to the network 144. In another example, the first POP system 146 may receive the downstream data and proceed to attempt delivery of the downstream data to the UT 108.

The POP system 146 is in communication with one or more ground stations 106(1), 106(2), . . . , 106(G) and the management system 150. In some implementations one or more functions may be combined. For example, the POP system 146 may perform one or more functions of the management system 150. In another example, the POP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 112.

The spacecraft 102, the ground station 106, the user terminal 108, the user device 112, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
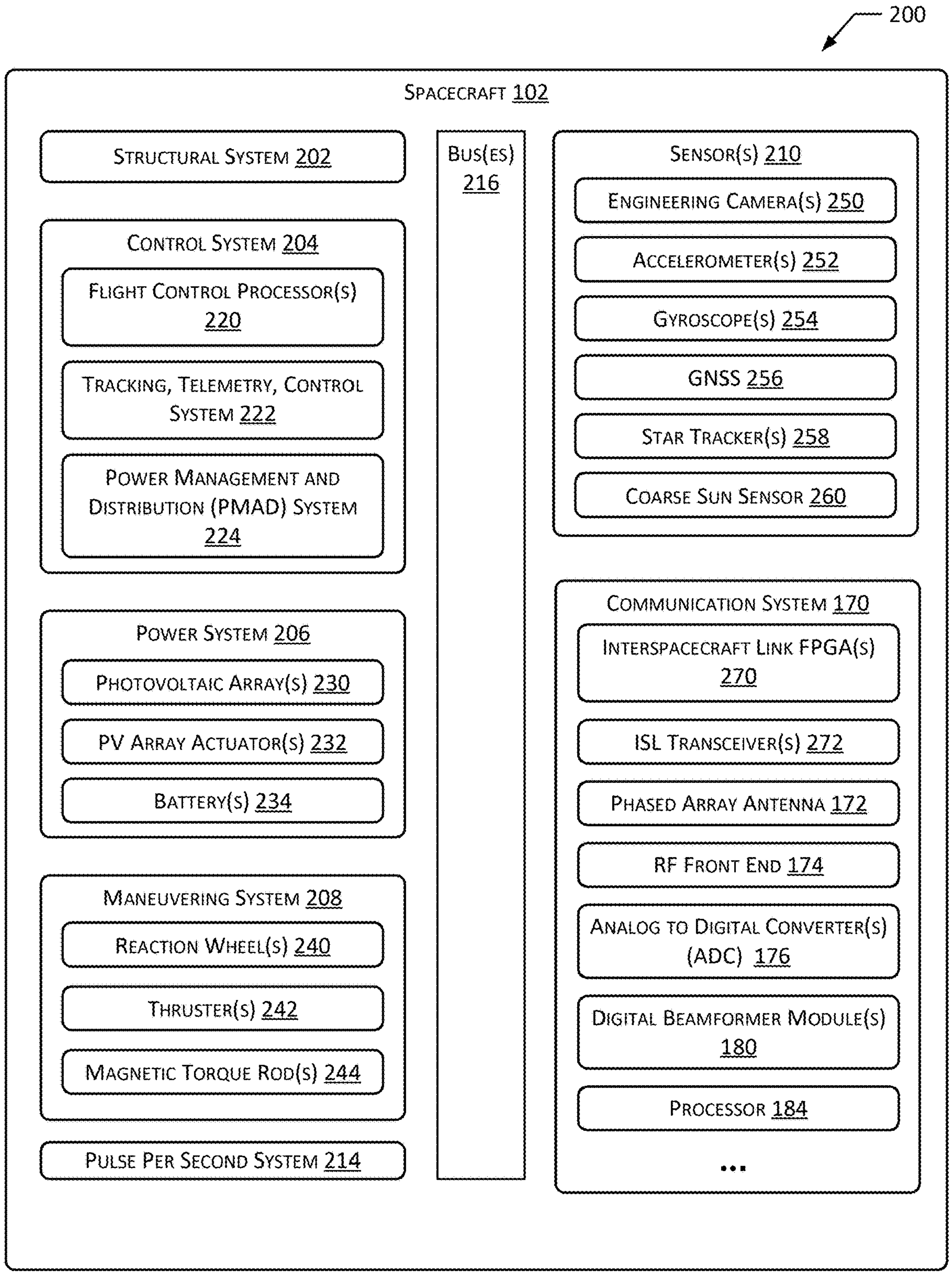
FIG. 2 is a block diagram of some systems associated with the spacecraft, according to some implementations.

FIG. 2 is a block diagram 200 of some systems associated with the spacecraft 102, according to some implementations. The spacecraft 102 may comprise a structural system 202, a control system 204, a power system 206, a maneuvering system 208, one or more sensors 210, and a communication system 170. A pulse per second (PPS) system 214 may be used to provide timing reference to the systems onboard the spacecraft 102. One or more buses 216 may be used to transfer data between the systems onboard the spacecraft 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus 216 may comprise coaxial cable, waveguides, and so forth to transfer radio signals from one part of the spacecraft 102 to another. In other implementations, some systems may be omitted or other systems added. One or more of these systems may be communicatively coupled with one another in various combinations.

The structural system 202 comprises one or more structural elements to support operation of the spacecraft 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the spacecraft 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 170. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the spacecraft 102, control battery 234 charging, and so forth.

The power system 206 provides electrical power for operation of the components onboard the spacecraft 102. The power system 206 may include components to generate electrical energy. For example, the power system 206 may comprise one or more photovoltaic (PV) arrays 230 comprising a plurality of photovoltaic cells, thermoelectric devices, fuel cells, and so forth. One or more PV array actuators 232 may be used to change the orientation of the photovoltaic array(s) 230 relative to the spacecraft 102. For example, the PV array actuator 232 may comprise a motor. The power system 206 may include components to store electrical energy. For example, the power system 206 may comprise one or more batteries 234, fuel cells, and so forth.

The maneuvering system 208 maintains the spacecraft 102 in one or more of a specified orientation or orbit 104. For example, the maneuvering system 208 may stabilize the spacecraft 102 with respect to one or more axes. In another example, the maneuvering system 208 may move the spacecraft 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The spacecraft 102 includes one or more sensors 210. The sensors 210 may include one or more engineering cameras 250. For example, an engineering camera 250 may be mounted on the spacecraft 102 to provide images of at least a portion of the photovoltaic array 230. Accelerometers 252 provide information about acceleration of the spacecraft 102 along one or more axes. Gyroscopes 254 provide information about rotation of the spacecraft 102 with respect to one or more axes. The sensors 210 may include a global navigation spacecraft system (GNSS) 256 receiver, such as a Global Positioning System (GPS) receiver, to provide information about the position of the spacecraft 102 relative to Earth. In some implementations the GNSS 256 may also provide information indicative of velocity, orientation, and so forth. One or more star trackers 258 may be used to determine an orientation of the spacecraft 102. A coarse sun sensor 260 may be used to detect the sun, provide information on the relative position of the sun with respect to the spacecraft 102, and so forth. The spacecraft 102 may include other sensors 210 as well. For example, the spacecraft 102 may include a horizon detector, radar, lidar, and so forth.

The communication system 170 provides communication with one or more other devices, such as other spacecraft 102, ground stations 106, user terminals 108, and so forth. The communication system 170 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other spacecraft 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, demodulating, decoding, decompressing, error correction, and formatting. Data decoded by the communication system 170 may be output to other systems. Output from a system, such as the control system 204, may be provided to the communication system 170 for transmission.

The communication system 170 may include hardware to support the interspacecraft link 196. For example, an interspacecraft link FPGA 270 may be used to modulate data that is sent and received by an ISL transceiver 272 to send data between spacecraft 102. The ISL transceiver 272 may operate using radio frequencies, optical frequencies, and so forth.

The spacecraft 102 may maintain a ground station uplink using one or more of the antennas, RF front end(s), modems, and so forth. The spacecraft 102 may include one or more antennas. For example, one or more parabolic antennas may be used to provide communication between the spacecraft 102 and one or more ground stations 106. In another example, a phased array antenna (PAA) 172 may be used to provide communication between the spacecraft 102 and the UTs 108.

The RF front ends 174 may comprise software defined radios (SDRs), direct sampling receivers, and so forth. The RF front ends 174 may include, or may send analog signals to, one or more analog-to-digital converters (ADCs) 176. The ADCs 176 provide as output raw samples 178. In some implementations the RF front ends 174 may include ADCs 176, such as in the case of direct sampling receivers.

The communication system 170 includes one or more digital beamformer (DBF) modules 180. In some implementations the DBF modules 180 may be configured to accept input from one or more antennas in the PAA 172. For example, each antenna or a subset of antennas may provide raw samples 178 to a single DBF module 180. The DBF module 180 applies one or more digital beamforming algorithms and may perform other operations as described below.

The communication system 170 includes one or more processors 184. The processor 184 may comprise instructions executing on one or more DSPs, general processors, application specific integrated circuits (ASICs), FPGAs, or a combination thereof. The processor 184 may provide various functions such as modulator, demodulator, and so forth. For example, a demodulator may operate to demodulate a signal that is represented by samples and produce demodulated data 186 as output.

The communication system 170 may comprise other processors. For example, one or more processors may include other modems used to generate signals based on input data to send data on a downlink from the spacecraft 102 to the ground station 106 or the UT 108.

Figure 3:
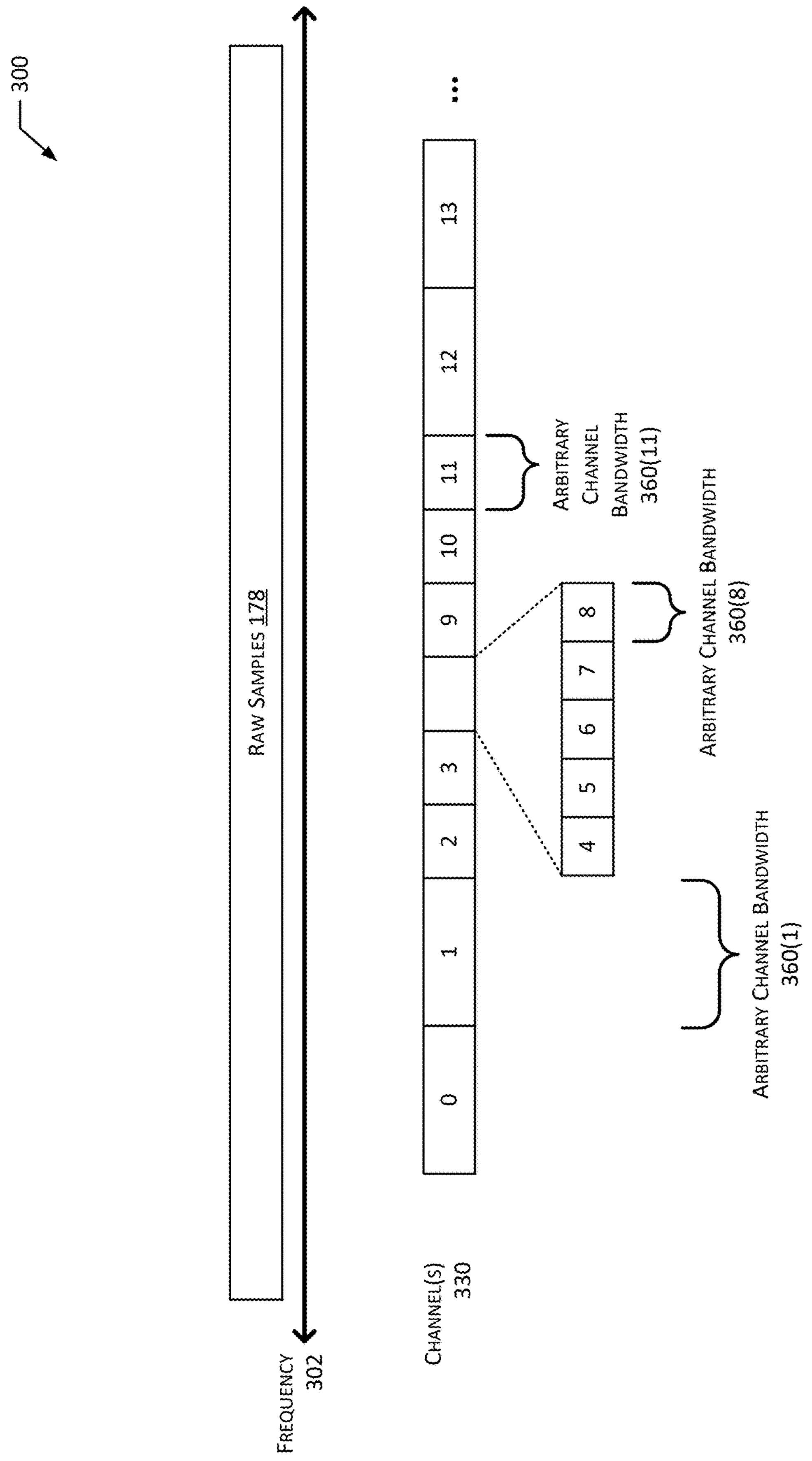
FIG. 3 illustrates arbitrary channelization that the system may support, according to some implementations.

FIG. 3 illustrates at 300 arbitrary channelization that the system may support, according to some implementations. In this illustration frequency 302 is depicted along a horizontal axis.

The raw samples 178 in this example represent one or more analog signals that have been received at the spacecraft 102. For example, the communication system 170 onboard the spacecraft 102 may have acquired the signals using the PAA 172 that are represented by the raw samples 178. In this illustration, the raw samples 178 are oversampled from the analog input.

Also depicted are a plurality of channels 330. Each channel 330 is associated with a specified frequency range. As shown in the illustration, the system described herein supports channels with arbitrary channel bandwidths. For example, a first channel 330(1) may have an arbitrary channel bandwidth 360(1) of 50 MHz, an eighth channel 330(8) has an arbitrary channel bandwidth 360(8) of 5 MHz, and an eleventh channel 330(11) has an arbitrary channel bandwidth 360(11) of 25 MHz.

The channels 330 may have arbitrary bandwidths that are rational number multiples with respect to one another. For example, a first channel 330 may have a first bandwidth and a second channel 330 has a second bandwidth that is a rational number multiple of the first bandwidth. The rational number may consist of a number that can be expressed as a quotient of two integers, where the denominator is not zero.

In some implementations, the raw samples 178 may have had their respective frequencies adjusted to compensate for Doppler effects before or during processing. For example, the DBF module 180 or the processor 184 may apply a frequency translation to adjust the frequencies of samples such that the samples are now representative of signals associated with respective channels 330 rather than being skewed by Doppler effects.

In some implementations, individual channels 330 may not be used for data transfer. For example, channels at the lower and upper bounds may be set aside as guard channels to allow for frequency changes due to Doppler effects, to accommodate processing and filtering, and so forth. Continuing the example, channels 330(0) and 330(13) in this figure may be used as guard channels and are not used for data transfer.

With regard to FIGS. 4A-6B, one or more of the DBF modules 180 or the modules associated with the processor(s) 184 may be implemented as instructions executing on one or more digital signal processors (DSPs) or other processors.

Figure 4A:
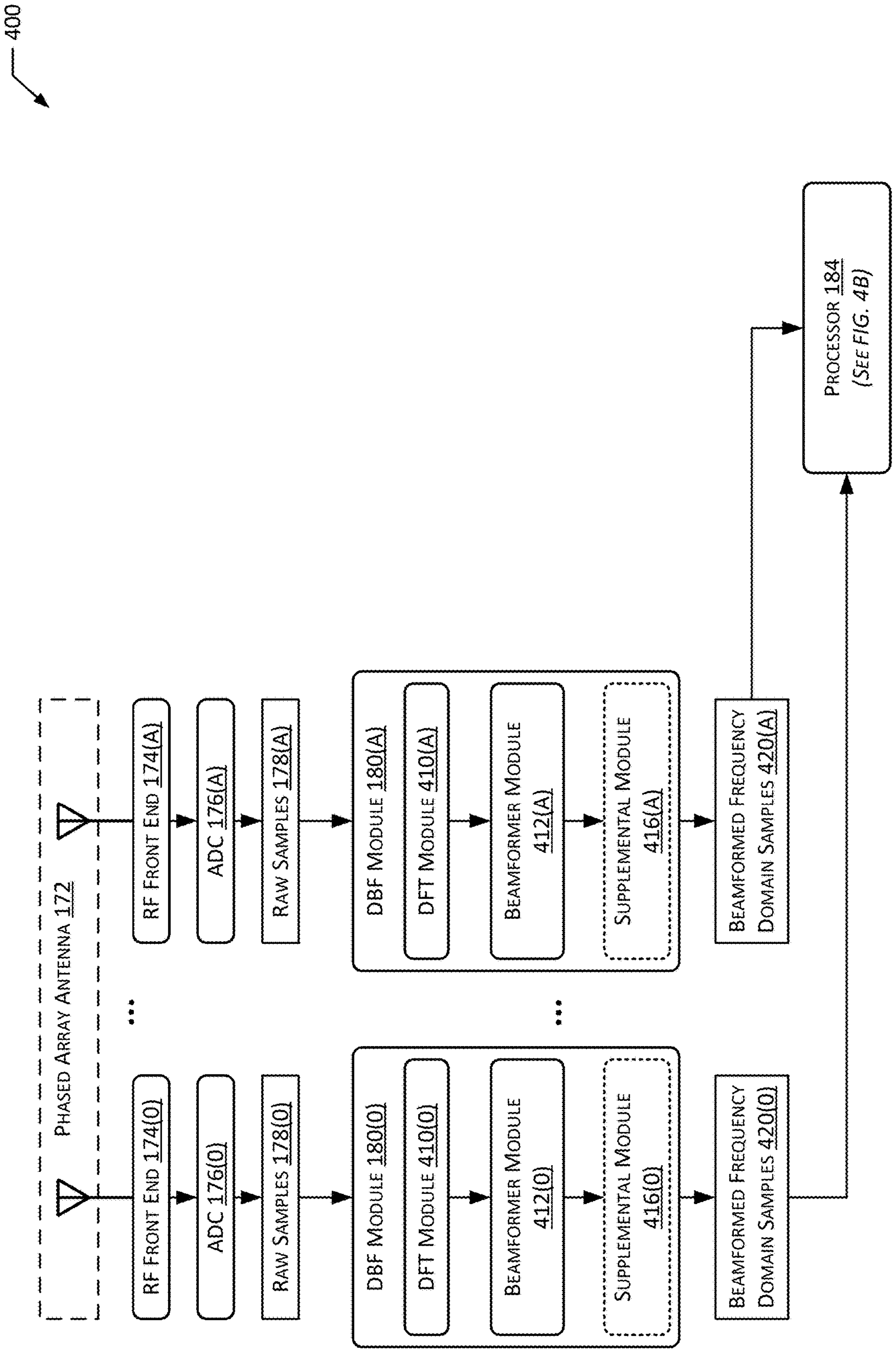
FIGS. 4A and 4B illustrate a first architecture of a frequency domain channelization system, according to some implementations.
Figure 4B:
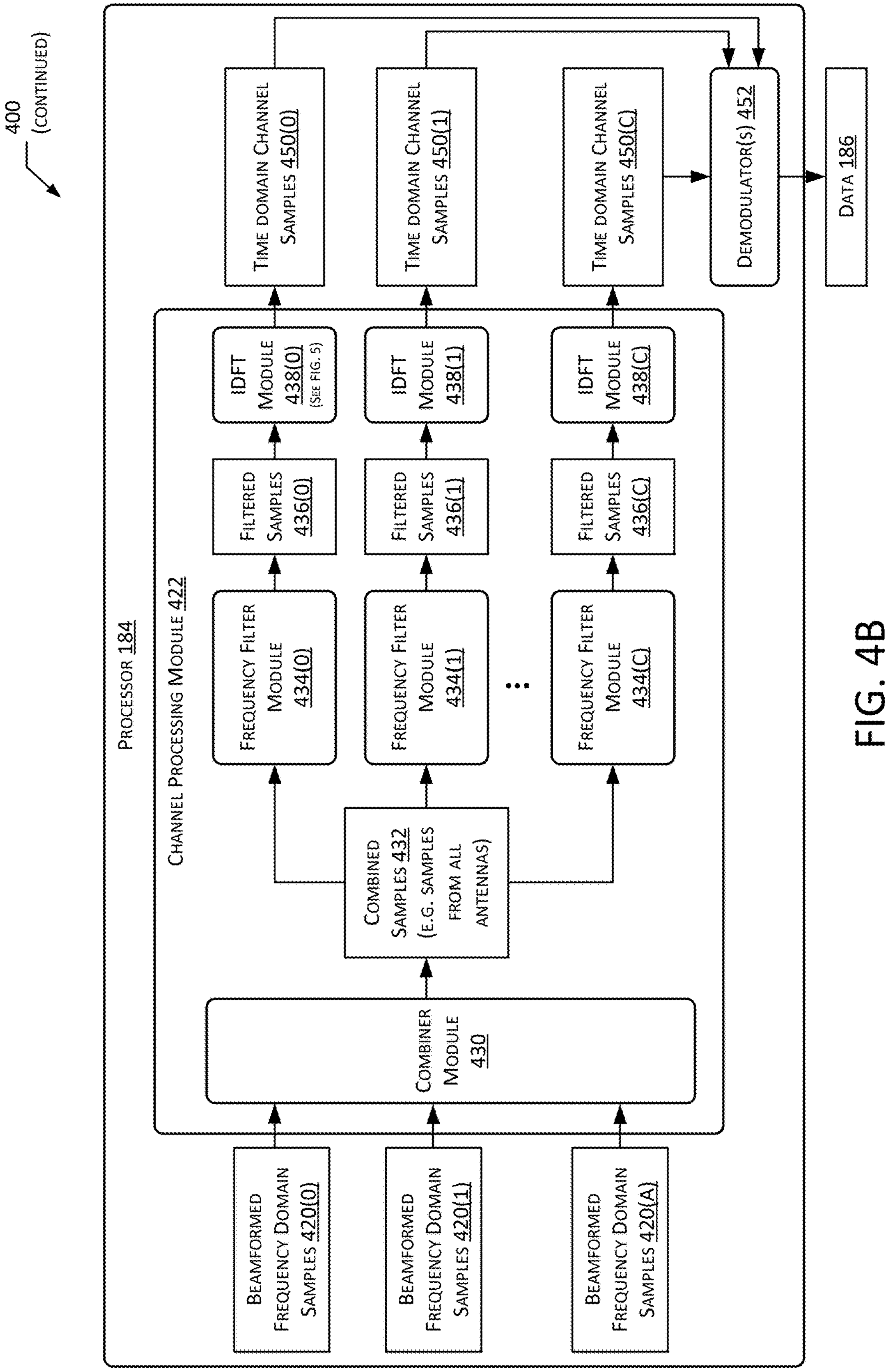

FIGS. 4A-4B illustrate at 400 a first architecture of a frequency domain channelization system, according to some implementations.

A PAA 172 comprises a plurality of antennas. One or more of these antennas acquire signals that are provided to one or more RF front ends 174. For example, each antenna may be associated with an RF front end 174 and an ADC 176. The PAA 172 may include thousands of antennas, and as a result there may be thousands of RF front ends 174(0)-(A) and ADCs 176(0)-(A) producing streams of raw samples 178(0)-(A).

In other implementations, a hybrid approach may utilize one or more antennas that may include analog beamforming circuitry to provide signals to an ADC 176. For example, 8 antennas may be coupled to analog beamforming circuitry, with their analog output provided to an input of an RF front end 174(0).

The ADC 176 provides as output raw samples 178 that are provided to a digital beamformer (DBF) module 180. In this illustration, each ADC 176(0)-(A) is associated with a respective DBF module 180(0). The raw samples 178 are in the time domain (TD), in that each sample represents one or more sample values, such as an amplitude of a signal during a sampled time interval.

Each of the DBF modules 180 may include one or more modules such as a Discrete Fourier Transform (DFT) module 410, beamformer module 412, a supplemental module 416, or other modules.

The DFT module 410 accepts the raw samples 178 as input and generates as output frequency domain (FD) raw samples. For example, in the FD, the raw samples 178 now represent the frequency during the sampled time interval. The DFT module 410 may implement a DFT or DFT algorithm.

In the implementation shown, the DBF module 180 may process the FD raw samples using a delay and sum beamforming technique. For example, the beamformer module 412 may apply one or more phase changes to the samples and may perform gain scaling on the magnitude of those samples. The resulting samples may then be summed at a summation module to provide first beamformed FD samples. For example, the delay and sum approach may be used for initial beamforming that provides for gain along a specified direction, such as at 10 degree steps or increments of one or more of azimuth or elevation relative to the plane of the PAA 172.

The DBF module 180 may include a supplemental module 416. The supplemental module 416 may apply one or more other beamforming algorithms to the first beamformed FD samples and provides as output beamformed FD samples 420. For example, the supplemental module 416 may implement one or more of a phase-shift beamformer algorithm, a minimum variance distortionless response (MVDR) beamformer algorithm, a Capon beamforming algorithm, a filter-and-sum beamforming algorithm, and so forth. The supplemental module 416 may be used to produce "fine" beamforming. Continuing the earlier example, the supplemental module 416 may allow for refinement of the beam down to 2 degree increments.

In some implementations the supplemental module 416 may perform other functions. For example, the supplemental module 416 may manage transfer of data that is received by the DBF module 180, sent by the DBF module 180, and so forth. In another example, the supplemental module 416 may combine or otherwise process incoming data received from other DBF modules 180 with data produced locally by the DBF module 180. For example, the beamformed frequency domain samples 420 received from upstream DBF modules 180 may be combine with the locally generated beamformed frequency domain samples 420 before being sent to a downstream DBF module 180. In another example, the supplemental module 416 may control parameters used to operate other modules of the DBF module 180, such as the DFT module 410, beamformer module 412, and so forth.

In some implementations one or more operations associated with the supplemental module 416 may be distributed between the DBF module 180 and the processor 184. For example, a first portion of the MVDR beamforming operations may be performed at the DBF module 180 while a second portion of the MVDR beamforming operations are performed at the processor 184.

In implementations in which the supplemental module 416 is omitted, the beamformed FD samples 420 may consist of the frequency domain samples provided by the beamformer module 412.

Each of the DBF modules 180(0)-(A) sends its respective stream of beamformed FD samples 420(0)-(A) to the processor 184. In some implementations the DBF modules 180 may be daisy-chained along a common data bus. For example, DBF module 180(0) may send its beamformed FD samples 420(0) to DBF module 180(1) that generates its beamformed FD samples 420(1) and sends those along with the beamformed FD samples 420(0) to the next DBF module 180(2) and so on until delivery to the processor 184.

With respect to FIG. 4B, the streams of beamformed FD samples 420(0)-(A) are received at a channel processing module (CPM) 422. In this illustration, a combiner module 430 receives the streams of beamformed FD samples 420(0)-(A) and generates combined samples 432. For example, the combined samples 432 may comprise samples from all antennas that are used during the receive operation.

The combined samples 432 may then be processed by one or more frequency filter modules (FFM) 434(0)-(C). Each FFM 434 comprises frequency filtering algorithms configured to filter input samples and provide as output filtered samples 436 that are associated with a specified range of frequencies that correspond to a specified channel 330. The CPM 422 may support channels 330 of arbitrary channel bandwidth and relative arrangement, subject to the limitations of the processor 184 hardware to perform the corresponding operations described herein.

The stream of filtered samples 436 provided by the associated FFM 434 may then be processed by an inverse DFT (IDFT) module 438. The IDFT module 438 implements one or more IDFT algorithms that convert the filtered samples 436 from the FD to TD channel samples 450. The IDFT module 438 is discussed in more detail with regard to FIG. 5. The streams of TD channel samples 450(0)-(C) may then be provided to inputs of one or more demodulators 452. The demodulators 452 may process the TD channel samples 450 to recover the data 186 that is represented therein. The data 186 may then be sent to other devices, such as a network processor.

Operation of the CPM 422 is dynamic, quickly allowing the processor 184 to switch to use different channels 330 with varying channel bandwidths. This allows the communication system 170 to quickly be reconfigured to receive signals utilizing different waveforms. This allows the processor 184 to process any arbitrary scheme of channels 330.

Compared to the circuitry associated with the DBF modules 180, the processor 184 may be more electrically and computationally efficient. For example, the processor 184 may require less electrical power (and thus dissipate less heat) and may be faster at performing one or more of the operations described, such as the FFM 434 and IDFT modules 438.

In some implementations, the processor 184 may perform additional beamforming operations. For example, a filter and sum beamforming algorithm may be implemented.

Figure 5:
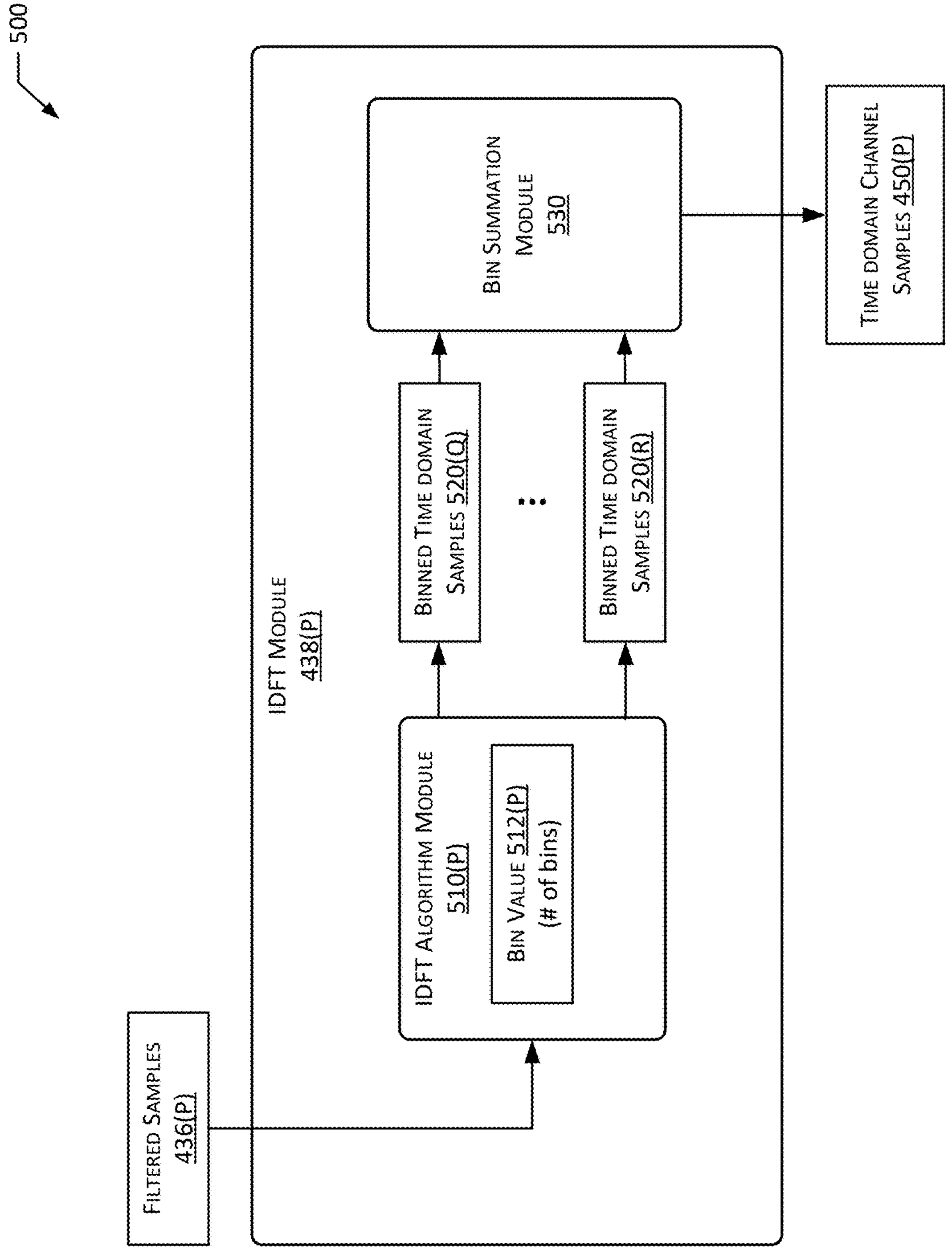
FIG. 5 illustrates a block diagram of an Inverse Discrete Fourier Transform (IDFT) module, according to some implementations.

FIG. 5 illustrates at 500 a block diagram of an Inverse Discrete Fourier Transform (IDFT) module 438, according to some implementations. Filtered samples 436(P) are provided as input to the IDFT module 438(P). The IDFT module 438(P) may comprise one or more of an IDFT algorithm module 510(P) and a bin summation module 530.

The IDFT algorithm module 510(P) implements an IDFT algorithm to process the TD filtered samples 436(P) and generate binned time domain samples 520(Q)-(R). Each set of binned time domain samples 520 represents, in the TD, a specified range of frequencies. The IDFT algorithm accepts a bin value 512(P) parameter that specifies a number of bins to be used. Each bin corresponds to a range of frequencies that signals are to be decomposed into. Each bin may be of equal size, such as each bin corresponding to a range of frequencies that are 50 kHz from lower to upper bound. The bin value 512 may be selected such that the resulting binned TD samples 520 when summed provide a sufficient representation of the analog TD signal to allow for recovery of the data 186 by the demodulator 452.

The binned time domain samples 520(Q)-(R) are provided as input to a bin summation module 530 that sums the binned time domain samples 520 to produce as output the TD channel samples 450(P).

In some implementations additional bins may be added to avoid spectral distortion and accommodate frequency adjustments such as due to Doppler effect of received signals. For example, a lower guard bin may be added that is associated with samples having a frequency between a minimum frequency and a first frequency of an analog signal. Continuing the example, an upper guard bin may be added that is associated with samples having a frequency between a second frequency and a maximum frequency of the analog signal. These bins may be used to avoid spectral distortion. An additional bin may be added to accommodate Doppler effect compensation. For example, a supplemental bin may be added that has a frequency width that is less than or equal to a maximum doppler shift that is associated with the operation of the system. For example, the maximum doppler shift is up to 50 KHz, the supplemental bin may be added that has a frequency width of 50 KHz. In some implementations the frequency range of the supplemental bin may be below the lower guard bin or above the upper guard bin.

The IDFT algorithm module 510 may implement "overlap and save" processing (also known as "overlap and discard") in which the filtered samples 436 are buffered into overlapping blocks, with IDFT performed on each block. This avoids the introduction of cyclic distortions in the binned time domain samples 520 and resulting TD channel samples 450.

In some implementations the IDFT module 438 may selectively scale or utilize particular bins. For example, a multiplication coefficient may be applied to particular bins. Such scaling may be used for various functions, such as to perform channel equalization. In some implementations masking may be utilized to selectively disregard data associated with one or more specified bins.

The IDFT modules 438 used by the CPM 422 may be operated using different bin values 512. For example, for channel 330(0) that is associated with a 48 MHz bandwidth, the IDFT module 438(0) may be operated with a bin value 512(0) of "288". Meanwhile, the IDFT module 438(10) is operated with a bin value 512(10) of "1092".

Figure 6A:
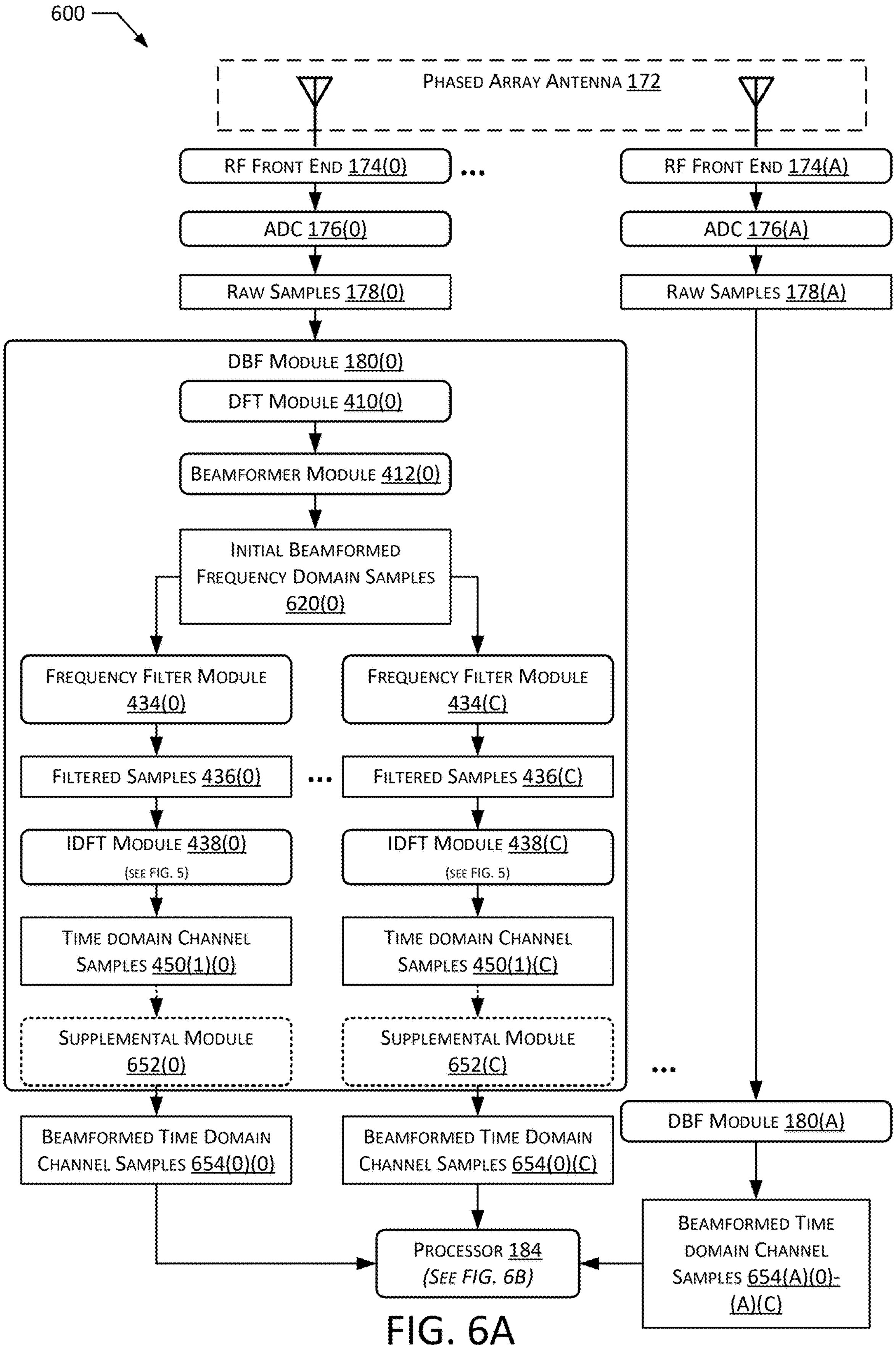
FIGS. 6A and 6B illustrate a second architecture of a frequency domain channelization system, according to some implementations.
Figure 6B:
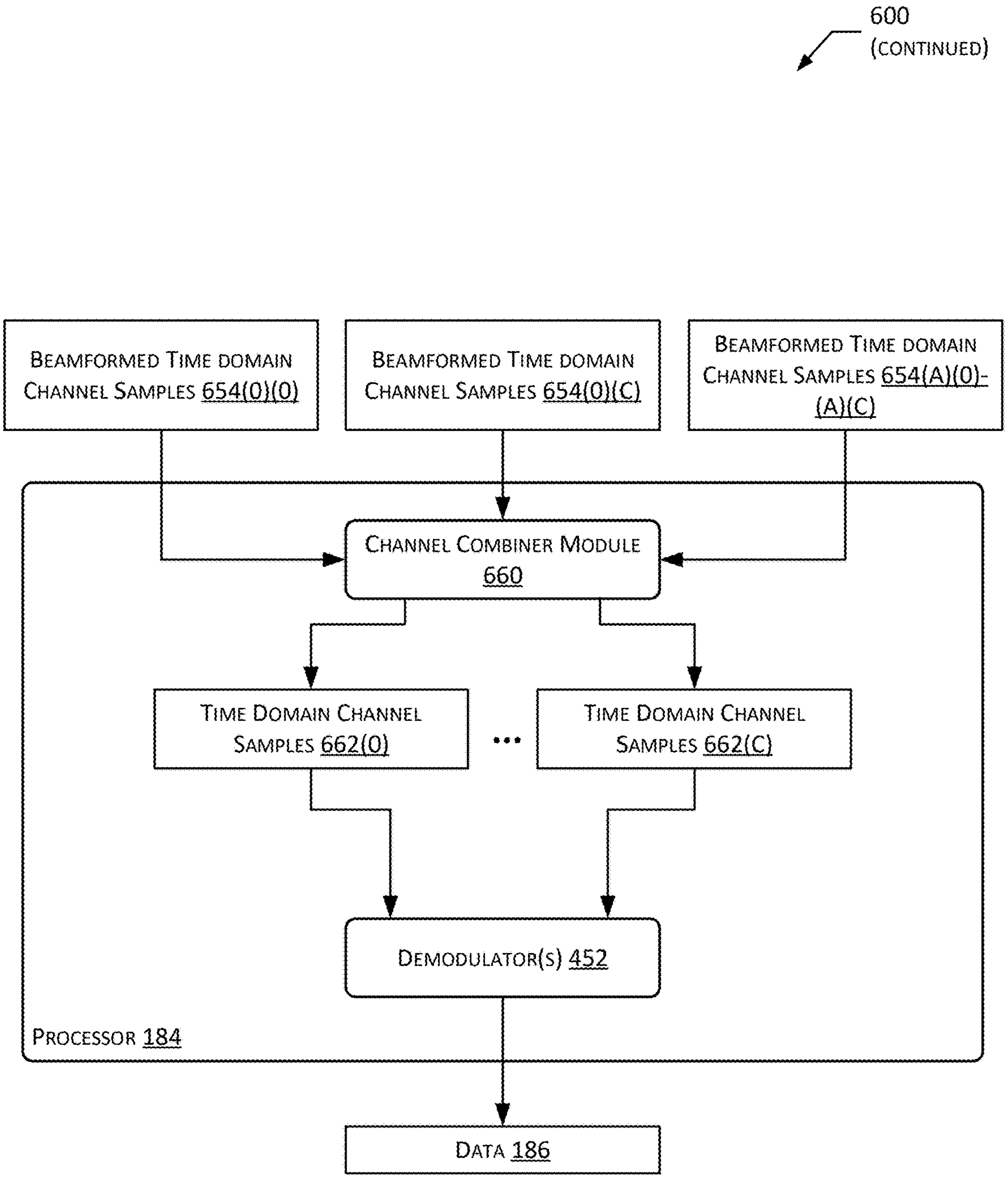

FIGS. 6A-6B illustrate at 600 a second architecture of a frequency domain channelization system, according to some implementations.

A PAA 172 comprises a plurality of antennas. One or more of these antennas acquire signals that are provided to one or more RF front ends 174. For example, each antenna may be associated with an RF front end 174 and an ADC 176. The PAA 172 may include thousands of antennas, and as a result there may be thousands of RF front ends 174(0)-(A) and ADCs 176(0)-(A) producing streams of raw samples 178(0)-(A).

In other implementations, a hybrid approach may utilize one or more antennas that may include analog beamforming circuitry to provide signals to an ADC 176. For example, 8 antennas may be coupled to analog beamforming circuitry, with their analog output provided to an input of an RF front end 174(0).

The ADC 176 provides as output raw samples 178 that are provided to a digital beamformer (DBF) module 180. In this illustration, each ADC 176(0)-(A) is associated with a respective DBF module 180(0). The raw samples 178 are in the time domain (TD), in that each sample represents one or more samples values, such as an amplitude of a signal during a sampled time interval.

Each of the DBF modules 180 may include one or more modules such as a Discrete Fourier Transform (DFT) module 410, beamformer module 412, a supplemental module 416, or other modules.

The DFT module 410 accepts the raw samples 178 as input and generates as output frequency domain (FD) raw samples. For example, in the FD, the raw samples now represent the frequency during the sampled time interval. The DFT module 410 may implement a discrete Fourier transform (DFT) algorithm.

In the implementation shown, the DBF module 180 may process the FD raw samples using one or more beamforming algorithms. For example, the beamformer module 412 may apply one or more phase changes to the samples and may perform gain scaling on the magnitude of those samples to implement a delay and sum beamforming technique. The resulting modified FD samples may then be summed at a summation module to provide initial beamformed FD samples 620. The beamforming provided by the beamformer module 412 may be coarse or fine. For example, coarse beamforming may provide for gain along a specified direction, such as at 10 degree steps or increments of one or more of azimuth or elevation relative to the plane of the PAA 172. Continuing the example, fine beamforming may provide gain along a specified direction with smaller degree steps or increments of one or more of azimuth or elevation.

In this architecture, the DBF modules 180 include the one or more FFMs 434 and associated IDFT modules 438. For example, each DBF module 180 may include FFMs 434(0)-(C) and IDFT modules 438(0)-(C).

The initial beamformed FD samples 620 are processed by one or more frequency filter modules (FFM) 434(0)-(C). Each FFM 434 is configured to filter input samples and provide as output filtered samples 436 that are associated with a specified range of frequencies that correspond to a specified channel 330. The system may support channels 330 of arbitrary channel bandwidth and relative arrangement, subject to the limitations of the hardware to perform the corresponding operations described herein.

The stream of filtered samples 436 provided by the associated FFM 434 may then be processed by an inverse DFT (IDFT) module 438. The IDFT module 438 implements one or more IDFT algorithms that convert the filtered samples 436 from the FD to TD channel samples 450. The IDFT module 438 is discussed in more detail with regard to FIG. 5.

The DBF module 180 may include one or more supplemental modules 652(0)-(C). The streams of TD channel samples 450(0)-(C) may then be provided as input to one or more supplemental modules 652. The supplemental modules 652 may apply one or more other beamforming algorithms to the TD channel samples 450 and provide as output beamformed TD channel samples 654. For example, the supplemental module 652 may implement one or more of a phase-shift beamformer algorithm, a minimum variance distortionless response (MVDR) beamformer algorithm, a Capon beamforming algorithm, a filter-and-sum beamforming algorithm, and so forth. The supplemental module 652 may be used to produce "fine" beamforming. Continuing the earlier example, the supplemental module 652 may allow for refinement of the beam down to 2 degree increments.

In some implementations the supplemental module 652 may perform other functions. For example, the supplemental module 652 may manage transfer of data that is received by the DBF module 180, sent by the DBF module 180, and so forth. In another example, the supplemental module 652 may combine or otherwise process incoming data received from other DBF modules 180 with data produced locally by the DBF module 180. For example, the beamformed TD channel samples 654 received from upstream DBF modules 180 may be combined with the locally generated beamformed TD channel samples 654 before being sent to a downstream DBF module 180. In another example, the supplemental module 652 may control parameters used to operate other modules of the DBF module 180, such as the DFT module 410, beamformer module 412, and so forth.

In implementations in which the supplemental module(s) 652 is omitted, the beamformed time domain channel samples 654 may consist of the time domain channel samples 450.

The beamformed TD channel samples 654 may then be sent to the processor 184.

Each of the DBF modules 180(0)-(A) sends its respective stream of beamformed TD channel samples 654(0)(0)-(A)(C) to the processor 184. For example, each stream may represent the beamformed TD channel samples 654 for a respective one of the channels 330. In some implementations the DBF modules 180 may be daisy-chained along a common data bus. For example, DBF module 180(0) may send its beamformed TD channel samples 654(0)(0)-(0)(C) to DBF module 180(1) that generates its beamformed TD channel samples 654(1)(0)-(1)(C) and sends those along with the beamformed TD channel samples 654(0)(0)-(0)(C) to the next DBF module 180(2) and so on until delivery to the processor 184.

With respect to FIG. 6B, the processor 184 includes a channel combiner module 660 and one or more demodulators 452. The channel combiner module 660 receives the streams of beamformed TD channel samples 654 and generates TD channel samples 662(0)-(C). For example, the channel combiner module 660 may combine the individual streams of beamformed TD channel samples 654 associated with channel 1 received from the DBFs 180 into a single stream of TD channel samples 662(1).

The demodulators 452 may process the TD channel samples 662 to recover the data 186 that is represented therein. The data 186 may then be sent to other devices, such as a network processor.

In some implementations the techniques and systems described above may be operated using alternative configurations. In one alternative configuration, processing may be divided among DBF modules 180 such that an individual DBF module 180 is processing less than a complete set of the channels 330 used. For example, a first DBF module 180 may be configured to process a first set of channels while a second DBF module 180 may be configured to process a second set of channels, where the first set and the second set are mutually exclusive. Such a configuration may be utilized to minimize power consumption, reduce power dissipation, to reduce a quantity of data transferred between one or more of the DBF modules 180 or the processor(s) 184, and so forth.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver or other global navigation spacecraft system may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a phased array antenna comprising a plurality of antennas;

a plurality of radio frequency (RF) front ends, wherein a first RF front end of the plurality of RF front ends comprises:

an RF input connected to a subset of the plurality of antennas, and an analog output;

a plurality of analog-to-digital converters (ADCs), wherein a first ADC of the plurality of ADCs comprises:

an analog input that is connected to the analog output of the first RF front end, and a first digital output that sends raw samples acquired at a sample rate, wherein the raw samples are in a time domain (TD);

a plurality of digital beamformers (DBFs), wherein a first DBF of the plurality of DBFs comprises:

a first digital input that receives the raw samples from an ADC;

a discrete Fourier transform (DFT) module that implements a DFT algorithm to convert the raw samples from the TD to frequency domain (FD) raw samples;

a first beamformer module that implements a first beamforming algorithm to process the FD raw samples to generate first beamformed FD samples; and a second digital output that sends second beamformed samples comprising one of (i) the first beamformed FD samples or (ii) data based on the first beamformed FD samples; and a processor comprising:

a second digital input that receives the second beamformed samples;

one or more modules to process the second beamformed samples and provide first TD channel samples comprising samples associated with a first channel that are represented in the time domain;

a demodulator to receive the first TD channel samples and generate first data; and a third digital output that sends the first data.

2. The system of claim 1, the first beamforming algorithm comprising a delay and sum algorithm that changes one or more of a phase or amplitude of a sample.

3. The system of claim 1, the processor further comprising:

a frequency filter module comprising one or more frequency filtering algorithms to process the second beamformed samples to generate filtered samples, wherein the filtered samples are associated with the first channel and are in the frequency domain; and an Inverse DFT (IDFT) module that implements an IDFT algorithm to convert the filtered samples from the frequency domain to the first TD channel samples.

4. The system of claim 3, wherein the IDFT module utilizes a first set of bins, each bin associated with a specified range of frequencies, and further wherein the first set of bins comprises:

a lower guard bin associated with samples having a frequency between a minimum frequency and a first frequency of an analog signal;

a plurality of bins, wherein each bin is associated with samples within a specified frequency range;

a supplemental bin having a frequency width that is less than or equal to a maximum doppler shift associated with operation of the system; and an upper guard bin associated with samples having a frequency between a second frequency and a maximum frequency of the analog signal.

5. The system of claim 1, the first DBF further comprising:

a frequency filter module comprising one or more frequency filtering algorithms to process the second beamformed samples to generate filtered samples, wherein the filtered samples are associated with the first channel; and an IDFT module that implements an IDFT algorithm to convert the filtered samples from the FD to the first TD channel samples; and wherein:

the second beamformed samples consist of the first TD channel samples.

6. The system of claim 5, wherein the IDFT module utilizes a first set of bins, each bin associated with a specified range of frequencies, and further wherein the first set of bins comprises:

a lower guard bin associated with samples having a frequency between a minimum frequency and a first frequency of an analog signal;

a plurality of bins, wherein each bin is associated with samples within a specified frequency range;

a supplemental bin having a frequency width that is less than or equal to a maximum doppler shift associated with operation of the system; and an upper guard bin associated with samples having a frequency between a second frequency and a maximum frequency of the analog signal.

7. The system of claim 1, the processor further comprising:

the one or more modules to process the second beamformed samples and provide second TD channel samples comprising samples associated with a second channel that are represented in the time domain, wherein:

the first channel has a first bandwidth and the second channel has a second bandwidth that is a rational number multiple of the first bandwidth.

8. A computer-implemented method comprising:

receiving at a first digital beamformer (DBF), raw samples acquired at a sample rate, wherein the raw samples are representative of one or more analog signals received using a phased array antenna in a time domain (TD);

processing at the first DBF the raw samples using a discrete Fourier transform (DFT) algorithm to generate frequency domain (FD) raw samples;

processing at the first DBF the FD raw samples using a first beamforming algorithm to generate first beamformed FD samples;

determining, at the first DBF, second beamformed samples comprising one of (i) the first beamformed FD samples or (ii) data based on the first beamformed FD samples;

processing at a first processor the second beamformed samples to provide first TD channel samples comprising samples associated with a first channel that are represented in the time domain;

demodulating the first TD channel samples to generate first data that is associated with the first channel; and sending the first data.

9. The method of claim 8, wherein the first beamforming algorithm comprises a delay and sum algorithm that changes one or more of a phase or amplitude of a sample.

10. The method of claim 8, wherein the second beamformed samples comprise the first beamformed FD samples; and processing at the first processor the first beamformed FD samples using one or more frequency filtering algorithms to generate filtered samples, wherein the filtered samples are associated with the first channel and are in the frequency domain; and processing at the first processor the filtered samples using an Inverse DFT (IDFT) algorithm to convert the filtered samples from the frequency domain to the first TD channel samples.

11. The method of claim 10, wherein the IDFT algorithm utilizes a first set of bins, each bin associated with a specified range of frequencies, and further wherein the first set of bins comprises:

a lower guard bin associated with samples having a frequency between a minimum frequency and a first frequency of an analog signal;

a plurality of bins, wherein each bin is associated with samples within a specified frequency range;

a supplemental bin having a frequency width that is less than or equal to a maximum doppler shift associated with operation; and an upper guard bin associated with samples having a frequency between a second frequency and a maximum frequency of the analog signal.

12. The method of claim 8, further comprising:

processing at the first DBF the first beamformed FD samples using one or more frequency filtering algorithms to generate filtered samples, wherein the filtered samples are associated with the first channel and are in the frequency domain; and processing at the first DBF the filtered samples using an Inverse DFT (IDFT) algorithm to convert the filtered samples from the frequency domain to the first TD channel samples; and wherein:

the second beamformed samples consist of the first TD channel samples.

13. The method of claim 12, wherein the IDFT algorithm utilizes a first set of bins, each bin associated with a specified range of frequencies, and further wherein the first set of bins comprises:

a lower guard bin associated with samples having a frequency between a minimum frequency and a first frequency of an analog signal;

a plurality of bins, wherein each bin is associated with samples within a specified frequency range;

a supplemental bin having a frequency width that is less than or equal to a maximum doppler shift associated with operation; and an upper guard bin associated with samples having a frequency between a second frequency and a maximum frequency of the analog signal.

14. The method of claim 8, further comprising:

processing at the first processor the second beamformed samples to provide second TD channel samples comprising samples associated with a second channel that are represented in the time domain wherein:

the first channel has a first bandwidth and the second channel has a second bandwidth that is a rational number multiple of the first bandwidth.

15. A system comprising:

a plurality of digital beamformers (DBFs), wherein a first DBF of the plurality of DBFs comprises:

a first digital input that receives raw samples from one or more analog-to-digital converters (ADCs), wherein the raw samples are time domain (TD) representations of analog signals acquired by one or more antennas of a phased array antenna;

a Discrete Fourier Transform (DFT) module that implements a DFT algorithm to convert the raw samples from the TD to frequency domain (FD) raw samples;

a first beamformer module that implements a first beamforming algorithm to process the FD raw samples to generate first beamformed FD samples; and a first digital output that sends second beamformed samples comprising one of (i) the first beamformed FD samples or (ii) data based on the first beamformed FD samples; and a processor comprising:

a second digital input that receives the second beamformed samples;

one or more modules to process the second beamformed samples and provide first TD channel samples comprising samples associated with a first channel that are represented in the time domain;

a demodulator to receive the first TD channel samples and generate first data; and a second digital output that sends the first data.

16. The system of claim 15, the first beamforming algorithm comprising a delay and sum algorithm that changes one or more of a phase or amplitude of a sample.

17. The system of claim 15, the processor further comprising:

a frequency filter module comprising one or more frequency filtering algorithms to process the second beamformed samples to generate filtered samples, wherein the filtered samples are associated with the first channel and are in the frequency domain; and an Inverse DFT (IDFT) module that implements an IDFT algorithm to convert the filtered samples from the frequency domain to the first TD channel samples.

18. The system of claim 17, wherein the IDFT module utilizes a first set of bins, each bin associated with a specified range of frequencies, and further wherein the first set of bins comprises:

a lower guard bin associated with samples having a frequency between a minimum frequency and a first frequency of an analog signal;

a plurality of bins, wherein each bin is associated with samples within a specified frequency range;

a supplemental bin having a frequency width that is less than or equal to a maximum doppler shift associated with operation of the system; and an upper guard bin associated with samples having a frequency between a second frequency and a maximum frequency of the analog signal.

19. The system of claim 15, the first DBF further comprising:

a frequency filter module comprising one or more frequency filtering algorithms to process the second beamformed samples to generate filtered samples, wherein the filtered samples are associated with the first channel; and an Inverse DFT (IDFT) module that implements an IDFT algorithm to convert the filtered samples from the FD to the first TD channel samples; and wherein:

the second beamformed samples consist of the first TD channel samples.

20. The system of claim 15, the processor further comprising:

the one or more modules to process the second beamformed samples and provide second TD channel samples comprising samples associated with a second channel that are represented in the time domain, wherein:

the first channel has a first bandwidth and the second channel has a second bandwidth that is a rational number multiple of the first bandwidth.

* * * * *